Sept. 2, 1930.  G. H. EMERSON  1,774,921
METHOD OF HEATING THE FEED WATER OF LOCOMOTIVES
Filed Jan. 19, 1928   9 Sheets-Sheet 1

Sept. 2, 1930.   G. H. EMERSON   1,774,921
METHOD OF HEATING THE FEED WATER OF LOCOMOTIVES
Filed Jan. 19, 1928    9 Sheets-Sheet 4

Sept. 2, 1930.   G. H. EMERSON   1,774,921
METHOD OF HEATING THE FEED WATER OF LOCOMOTIVES
Filed Jan. 19, 1928   9 Sheets-Sheet 7

Fig. 7.

Sept. 2, 1930.  G. H. EMERSON  1,774,921
METHOD OF HEATING THE FEED WATER OF LOCOMOTIVES
Filed Jan. 19, 1928  9 Sheets-Sheet 8

Sept. 2, 1930. G. H. EMERSON 1,774,921
METHOD OF HEATING THE FEED WATER OF LOCOMOTIVES
Filed Jan. 19, 1928 9 Sheets-Sheet 9

Patented Sept. 2, 1930

1,774,921

UNITED STATES PATENT OFFICE

GEORGE H. EMERSON, OF BALTIMORE, MARYLAND

METHOD OF HEATING THE FEED WATER OF LOCOMOTIVES

Application filed January 19, 1928. Serial No. 247,900.

This invention relates to locomotives, and it has particular relation to locomotive feed water heating systems.

An object of the invention is to provide a method of heating the feed water so that the feed water will be supplied to the boiler at an extremely high temperature.

Another object is to provide a method of heating the feed water, in which the same exhaust steam is employed to increase the heat of feed water that has been previously heated by the exhaust steam.

Another object is to provide a method of heating the feed water, in which the feed water is initially preheated to a temperature sufficient to permit the liberation of any destructive gases, then purified, and thereafter further heated to an extremely high temperature prior to entering the boiler.

Another object is to provide a method for supplying the boiler of a locomotive with preheated feed water, in which the feed water is first preheated to a temperature sufficient to permit the liberation of the destructive gases by mingling the water with exhaust steam in an open heater having purifying agencies, and then further heating the feed water by means of exhaust steam in a closed heater in which the exhaust steam does not come into direct contact with the feed water, the same exhaust steam being used first in the second heater and then in the first heater.

Other objects and advantages will hereinafter appear.

By my invention I have provided a method for preheating the feed water used in locomotive boilers wherein the water will be supplied to the locomotive boiler at a temperature considerably higher than it has heretofore been possible to preheat the feed water by any of the known methods.

Briefly stated, I take the cold feed water as it comes from the locomotive tender tank and discharge it through an eductor condenser into an open tank heater. The water is heated by mingling with exhaust steam in the eductor condenser, the steam being taken from the exhaust discharge of the locomotive cylinders. The capacity of the open tank heater should be such as to hold the water a length of time sufficient to permit the escape of the gases. Preferably the incoming water is mixed with sufficient steam to raise its temperature to 212° F., or higher. As the temperature of the water rises the gases are given off until at the boiling point little remains and after continued boiling, only traces are found.

In the discharge of the water from the eductor condenser, it passes over suitable means containing neutralizing agents adapted to remove any destructive elements in the water.

During the heating of the water in the open tank heater the greater part of the gases will be immediately released by escaping through a vent in the top of the heater. The oxygen will be still further reduced by the ferrous oxide clinging to the interior of the heater, so that the water delivered to the boiler without further contact with the air will be free from that gas. The free acid will be neutralized by the neutralizing agents in the heater.

After the water has been preheated and purified, it is pumped into a closed heater, preferably mounted on top of the boiler. The closed heater is so constructed that the preheated feed water from the open tank heater can be heated to a higher temperature by the exhaust steam from the locomotive cylinders without bringing the steam into direct contact with the feed water. The closed heater may be so arranged and connected to the open tank heater that the exhaust steam will be first caused to heat the preheated water in the closed heater and the same steam delivered to the open tank heater for the purpose of preheating the feed water therein.

Thus, by my method, the exhaust steam is used first, to increase the heat of preheated feed water in a closed heater, and then second, mingled with the feed water in an open tank heater for the purpose of preheating the water.

In the accompanying drawings, wherein I have diagrammatically illustrated a practical embodiment of a locomotive feed water heater so constructed as to carry out the method above described:—

Referring to the drawings, the locomotive frame 1 constitutes a support for a boiler 2 and a smoke box 3, the latter being mounted on the forward end of the boiler.

The smoke box 3 is provided with an exhaust nozzle 4 having an outlet 5 controlled by a valve 6.

The nozzle 4 is connected by exhaust steam passages 7 and 8 with valve chambers 9 and 10 of the cylinders 11 and 12, respectively, positioned on opposite sides of the locomotive.

A smoke stack 13 extends from the upper side of the smoke box 3 in direct alignment with the nozzle 4.

The front open end of the smoke box 3 may be normally closed by an imperforate plate 14 constituting the rear wall of an open tank heater 15.

The diameter of the heater 15 is such that the walls thereof are substantially a continuation of the walls of the smoke box 3.

The heater 15 is movably mounted on the adjacent front wall portion of the smoke box 3 by means of vertically positioned hinges 16 permitting a swinging movement of the heater in a horizontal plane.

Figure 1:
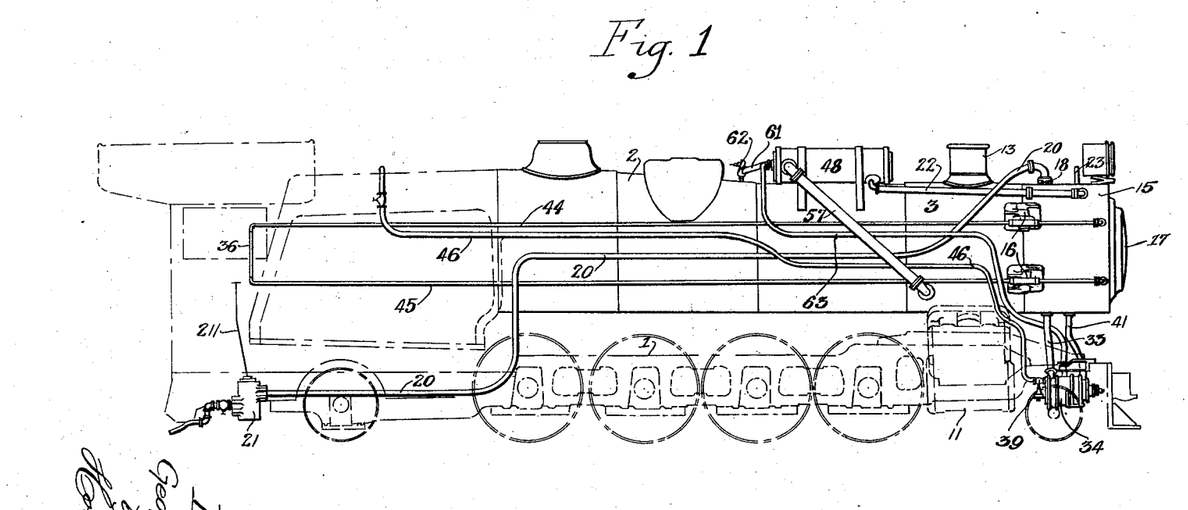
Figure 1 is a side elevation of a locomotive equipped to carry out the invention.

Thus, when the heater 15 is in the position shown in Fig. 1, the rear wall 14 thereof constitutes the front wall for the open end of the smoke box 3. However, when the heater 15 is swung about the hinges 16, access may be had to the smoke box 3 through its open end.

The structure of the heater 15 is completed by means of a front wall 17 which is shaped to resemble the ordinary front end of a locomotive boiler.

The preheating of the water is effected more or less as to whether the locomotive is working hard or light, consequently the heater 15 should have sufficient capacity to take care of this variation.

An eductor condenser 18 is positioned in the upper side of the heater 15. The eductor condenser has a discharge outlet 19 to which is coupled extensions 191 leading to perforated pipes 192 extending longitudinally of the heater 15.

Feed water may be supplied to the eductor condenser 18 through a pipe 20 coupled, in turn, to a pump 21 at the rear end of the locomotive. The pump draws the cold water from the tender tank and delivers it into the top of the eductor condenser 18. The pump 21 may be actuated through suitable mechanism diagrammatically indicated at 211 (Fig. 1).

Exhaust steam is also supplied to the condenser 18 through pipes 22.

Experience has shown that the usual boiler feed water contains large quantities of air, as well as acid, and as a result, there is a rapid deterioration of the boiler parts, as well as low operating efficiency.

The gas in the feed water is eliminated by preheating the water to a relatively high temperature, say—between 150° F. and 212° F. Within these temperatures the oxygen and other gases are readily given off from the water.

The building up of high pressures in the heater 15 is prevented by means of a vent pipe 23, or other means offering a substantially unrestricted outlet for the liberated gases.

The undesirable chemical constituents of the feed water passing into the heater 15 may be removed by any desired agent, such as limestone 24 which is carried in trays 25 mounted on brackets 26 rigidly carried by the heater.

For the purpose of destroying other corrosive agents in the feed water before the water is admitted to the boiler 2, certain of the trays may contain iron filings 27.

At the sides of the heater 15 are inclined deflectors 271, which are so disposed as to direct water splashing from the upper trays into the trays below.

The trays 25 are arranged in series. One series is above the other and the spaces between the trays of one series are directly above the trays of the series below so that the water passing from the upper trays will flow into the trays beneath, and so on throughout the entire series. If so desired, the pipes 192 may be disposed above the upper trays in the manner shown by Fig. 5.

A condenser 28, in the present instance, shown as comprising two separate sections, each of which include a pair of spaced vertically extending manifolds 29 and 30 which are interconnected by pipes 31, is disposed within the heater 15 adjacent to the side walls thereof.

The lower ends of the manifolds 30 are provided with supply pipes 32 which are connected to an exhaust pipe 33 from a pump 34. The exhaust steam from the pump is thus passed through the pipe 33 up into the condenser 28.

Figure 5:
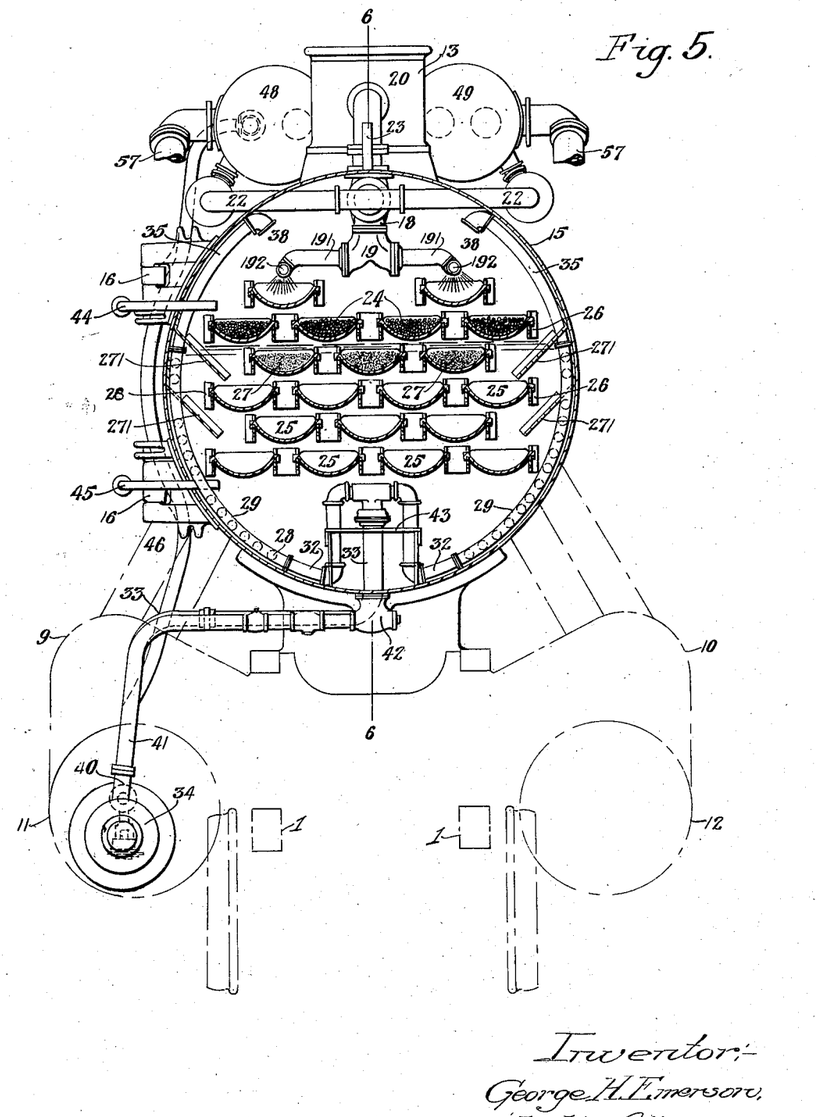
Fig. 5 is a vertical transverse section as seen from the line 5—5 of Fig. 2.
Figure 6:
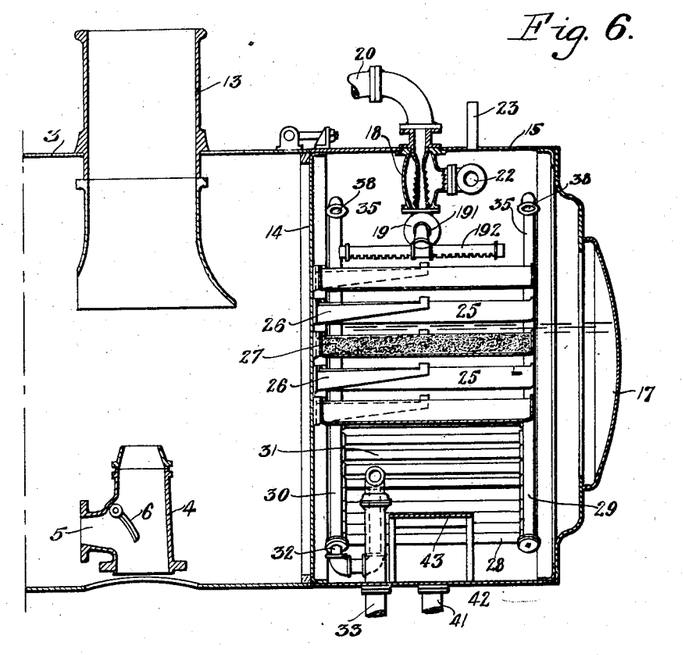
Fig. 6 is a vertical longitudinal section as seen from the line 6—6 of Fig. 5.

Connected to the upper end of each manifold 30 is a vertical section 35 that terminates in a downwardly extending discharge outlet 38 through which the condensate is discharged into the heater above the trays 25 (see Fig. 5).

The pump 34 has a steam inlet 39 and a suction opening 40. The opening 40 is connected by means of a pipe 41 to a discharge outlet 42 in the bottom of the heater 15.

A vortex may be prevented at this point by means of a baffle plate 43 suitably supported directly over the outlet 42.

For the purpose of maintaining the desired quantity of water in the heater 15, any suitable water level indicating means may be employed. In the present instance the water level indicator consists of a vertically disposed water gauge glass 36 which may be positioned in the cab of the locomotive. To the top and bottom of the water gauge glass 36 are connected pipes 44 and 45. The extremities of the pipes terminate within the heater, the end of the pipe 44 being disposed near the top of the heater, while the end of the pipe 45 is disposed in the bottom of the heater immediately below the bottom rows of trays 25.

The pump 34 may be supplied with steam through a pipe 46 leading from the boiler 2.

A closed feed water heater comprising sections 48 and 49 may be mounted on the upper side side of the boiler 2.

The sections of the closed heater are provided with spaced heads forming end chambers 50 and 51, respectively. The chamber 50 is provided with a central wall 52 that divides the chamber 50 into two chambers, one of which is provided with an inlet opening 53 and the other an outlet opening 54. The opening 54 of the section 48 is connected to the opening 53 of the section 49 by a pipe 59.

The space intermediate the chambers 50 and 51 may be supplied with steam through an inlet 55 and discharged therefrom through an outlet 56 that is connected to the pipe 22.

Figure 2:
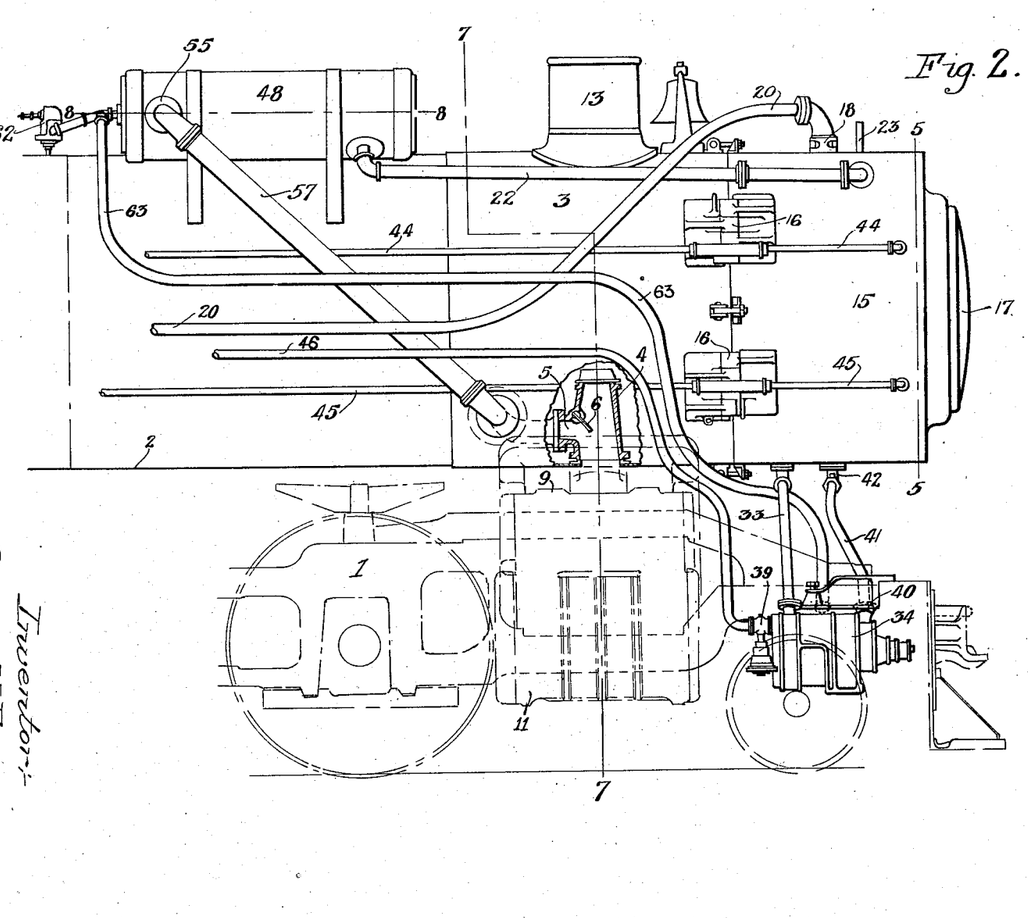
Fig. 2 is an enlarged side elevation of the front end of the locomotive.
Figure 3:
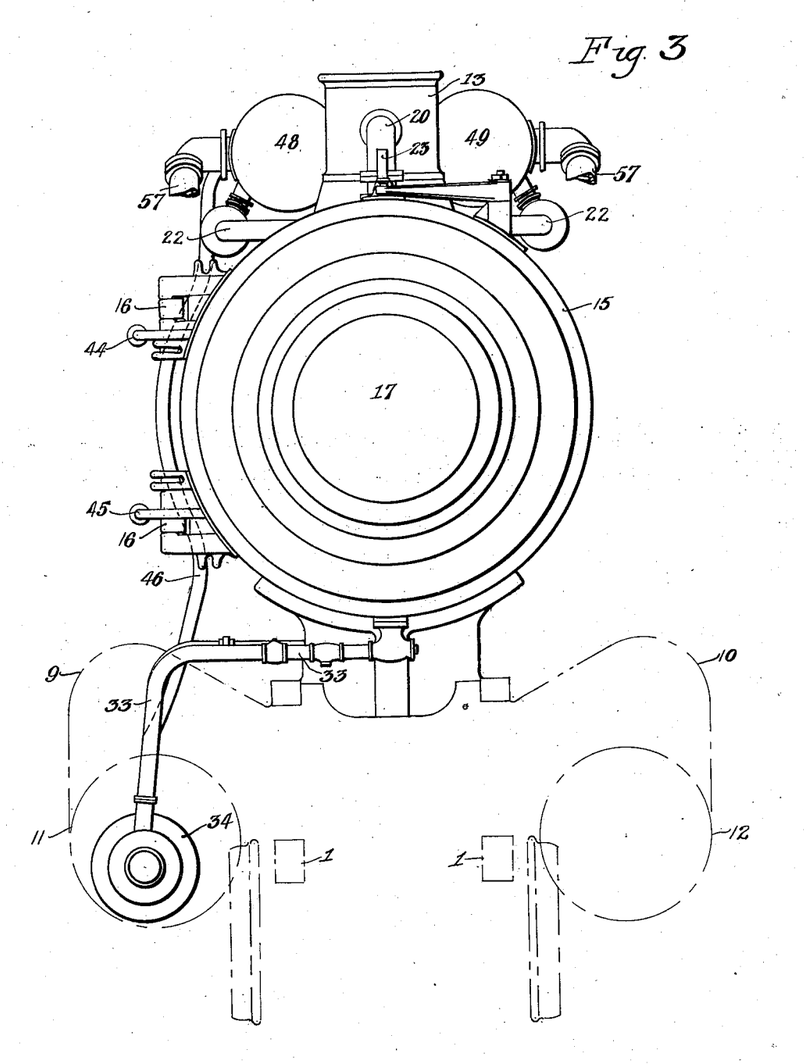
Fig. 3 is a view of the front end of the locomotive.
Figure 4:
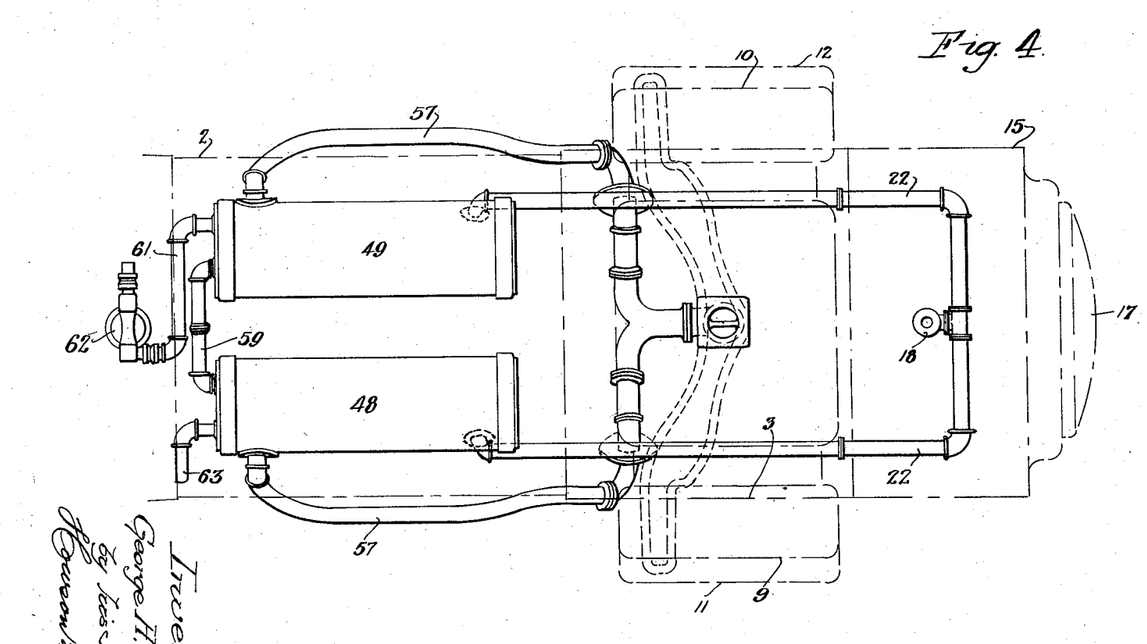
Fig. 4 is a plan of the structure shown in Fig. 2.
Figure 7:
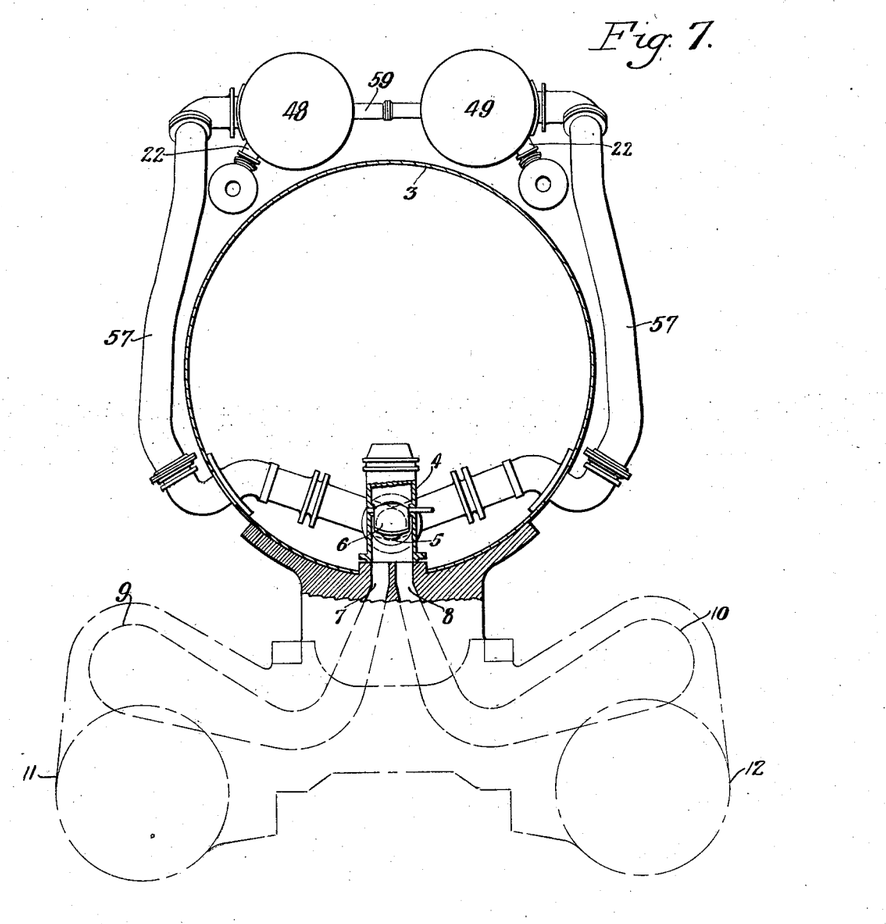
Fig. 7 is a vertical transverse section as seen from the line 7—7 of Fig. 2.
Figure 8:
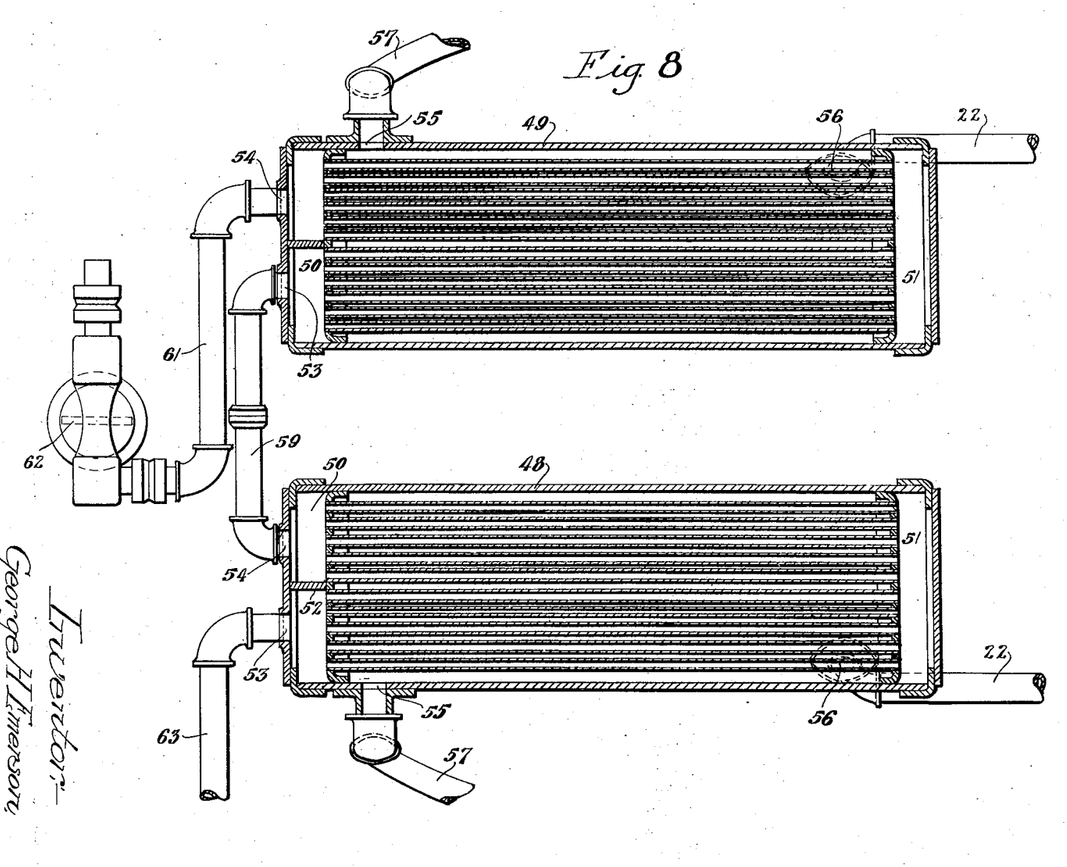
Fig. 8 is a longitudinal horizontal section through the closed heater, as seen from the line 8—8 of Fig. 2.
Figures 9, 11:
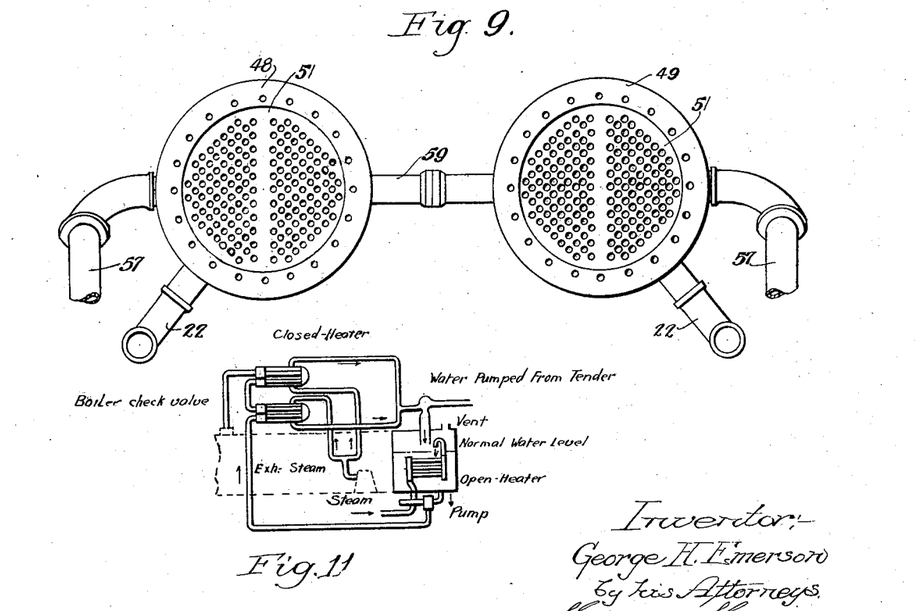
Fig. 9 is a view of the front end of the closed heater with the end plates of the sections thereof removed.
Fig. 10 is a similar view of the opposite end of the closed heater and Fig. 11 is a diagram of the installation shown in Fig. 3.
Figure 10:
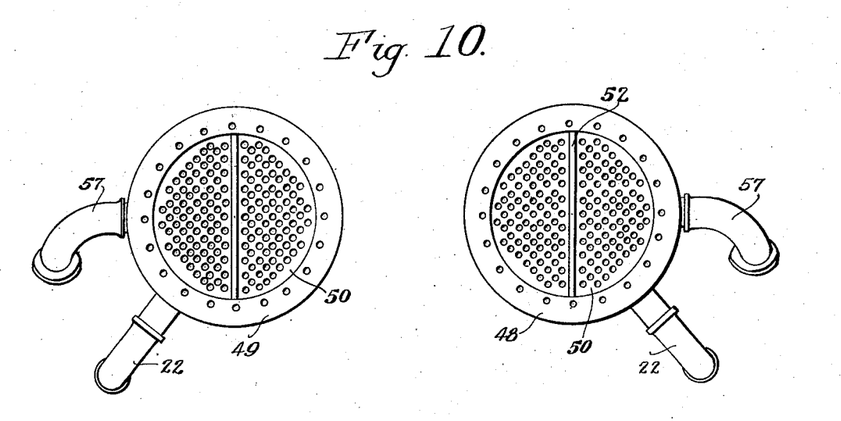

The inlets 55 are connected by means of pipes 57 to the outlet 5 of the exhaust steam for the nozzle 4, (see Figs. 2 and 7).

Thus, exhaust steam is initially passed from the exhaust nozzle 4 through the sections 48 and 49 of the closed heater and thereafter condensed in the eductor condenser 18, which discharges into the open tank heater 15.

The opening 54 of the section 49 is connected by means of a pipe 61 and check valve 62 to the boiler 2.

The feed water that is heated in the sections 48 and 49 of the closed heater is supplied thereto through a pipe 63 extending from the outlet 39 of the pump 34.

The operation is, as follows:

Cold water is drawn from the locomotive tender tank in the usual manner and is delivered through the pipe 20 to the eductor condenser 18 discharging into the upper portion of the heater 15. When the water is supplied to the eductor condenser 18 a vacuum is created in said condenser, causing a passage of steam from the nozzle 4 through the sections 48 and 49 of the closed feed water heater to the eductor condenser 18, thereby preheating the feed water before being discharged into the heater 15. The temperature of the feed water resulting from such preheating is such that the gases are readily liberated, passing off through the vent 23.

The preheated water discharged from the condenser 18 then flows over the trays 25, remaining a sufficient length of time in the heater 15 for the carbon dioxide and oxygen to be boiled out. The water is further heated by the exhaust steam from the pump 34 passing through the condenser 28, the resulting condensate being discharged into the heater through the outlets 38.

The effect of the condenser 28 is also to decrease the back pressure on the pump 34. Thus, the back pressure on the pump is not only reduced by the feed water in the heater 15, but the feed water is also further heated while undergoing degasification in the said heater.

The operation of the pump 34 causes the degasified feed water to pass from the bottom of the heater 15 up through the sections 48 and 49 of the closed heater, where the water is further heated by exhaust steam and thereafter discharged into the boiler 2 through the check valve 62.

From the foregoing it will be apparent that I have provided a method of supplying the boiler of a locomotive with preheated feed water which consists in first preheating the feed water by mingling the water with exhaust steam and then further heating the feed water by means of exhaust steam not in direct contact with the water, the same exhaust steam being used first in the second preheating and then in the first preheating.

The invention set forth herein is, of course, susceptible of various modifications and adaptations, and it will be understood that the invention can be applied to any part of a locomotive and tender other than that illustrated.

The invention claimed is:

1. A method of supplying the boiler of a locomotive with preheated feed water which comprises first employing exhaust steam to increase the heat in a closed tank of previously heated feed water and then using the same exhaust steam in finely divided streams to intimately commingle with and initially heat predetermined quantities of the feed water in an open tank having a volume sufficient to hold the water a length of time to permit the escape of the obnoxious gases.

2. A method of supplying the boiler of a locomotive with preheated feed water which comprises first employing the exhaust steam to increase the heat of previously heated feed water in a closed tank, and then using the same exhaust steam to initially heat the feed water in an open tank to a temperature ranging from 150° F. to 212° F., such open tank having a volume sufficient to hold the water a length of time to permit the escape of the obnoxious gases therefrom.

3. A method of supplying the boiler of a locomotive with preheated feed water which consists in first preheating the feed water to a temperature sufficient to permit the liberation of the gases, with the feed water in contact with purifying agencies, the feed water being preheated by mingling with fine streams into which the exhaust steam has been separated, and then further heating the feed water by means of exhaust steam not in direct contact with the water, the same exhaust steam being used first in the second preheating and then in the first preheating.

4. A method of supplying the boiler of a locomotive with preheated feed water which comprises first passing the exhaust steam through a closed heater containing preheated feed water, separating the steam into small streams or particles, and then mingling the separated streams or particles with cold water as the feed water enters an open container, to raise the feed water to a temperature sufficiently high to rid it of occluded gases.

5. A method of supplying the boiler of a locomotive with preheated feed water which comprises first employing exhaust steam to increase the heat in a closed tank of previously heated feed water, separating the feed water into finely divided streams, and then using the same exhaust steam to intimately commingle with and to intimately heat the feed water in another tank of sufficient volume to delay the passage of water therethrough for a time sufficient to rid it, as a result of its raised temperature, of occluded gases.

GEORGE H. EMERSON.